United States Patent
Basu et al.

(10) Patent No.: US 8,078,652 B2
(45) Date of Patent: Dec. 13, 2011

(54) VIRTUAL COLUMNS

(75) Inventors: Subhransu Basu, Fremont, CA (US); Harmeek Singh Bedi, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 314 days.

(21) Appl. No.: 11/951,890

(22) Filed: Dec. 6, 2007

(65) Prior Publication Data

US 2009/0150413 A1    Jun. 11, 2009

(51) Int. Cl.
*G06F 17/30* (2006.01)
(52) U.S. Cl. ........ 707/825; 707/609; 707/821; 707/963; 717/136
(58) Field of Classification Search ............... 707/3, 5
See application file for complete search history.

(56) References Cited

U.S. PATENT DOCUMENTS

| | | | |
|---|---|---|---|
| 589,986 A * | 9/1897 | Shay | |
| 5,761,653 A * | 6/1998 | Schiefer et al. | |
| 5,822,142 A * | 10/1998 | Hicken | 360/53 |
| 5,899,986 A | 5/1999 | Ziauddin | |
| 5,960,428 A * | 9/1999 | Lindsay et al. | |
| 5,995,957 A * | 11/1999 | Beavin et al. | |
| 6,006,219 A * | 12/1999 | Rothschild | |
| 6,029,163 A * | 2/2000 | Ziauddin | |
| 6,112,199 A | 8/2000 | Nelson | |
| 6,275,818 B1 | 8/2001 | Subramanian et al. | |
| 6,477,523 B1* | 11/2002 | Chiang | |
| 6,524,664 B1 | 2/2003 | Hashimoto et al. | |
| 6,529,901 B1* | 3/2003 | Chaudhuri et al. | |
| 6,609,131 B1 | 8/2003 | Zait et al. | |
| 6,665,684 B2 | 12/2003 | Zait et al. | |
| 6,711,563 B1* | 3/2004 | Koskas | 707/769 |
| 6,775,662 B1 | 8/2004 | Witkowski et al. | |
| 6,820,095 B1* | 11/2004 | Yeung et al. | 707/642 |
| 6,830,785 B1 | 12/2004 | Hayakawa et al. | |
| 6,931,390 B1* | 8/2005 | Zait et al. | 1/1 |
| 7,143,105 B2* | 11/2006 | Nakano et al. | 1/1 |
| 7,158,994 B1 | 1/2007 | Smith et al. | |
| 7,158,996 B2* | 1/2007 | Croisettier et al. | 707/741 |
| 7,171,408 B2* | 1/2007 | Zuzarte | |
| 7,302,422 B2* | 11/2007 | Bossman et al. | |
| 7,458,066 B2* | 11/2008 | Rhine | 717/136 |
| 7,693,812 B2* | 4/2010 | Lim et al. | 707/999.001 |
| 7,739,293 B2* | 6/2010 | Lightstone et al. | |
| 7,836,098 B2 | 11/2010 | Baby et al. | |
| 2001/0016843 A1 | 8/2001 | Olson et al. | |
| 2002/0087518 A1* | 7/2002 | Ellis et al. | |
| 2002/0194157 A1 | 12/2002 | Zait et al. | |
| 2003/0084025 A1* | 5/2003 | Zuzarte | 707/2 |

(Continued)

OTHER PUBLICATIONS

U.S. Appl. No. 11/951,918, filed Dec. 6, 2007, Office Action mailed Dec. 1, 2010.

(Continued)

*Primary Examiner* — Sheree Brown
(74) *Attorney, Agent, or Firm* — Hickman Palermo Truong & Becker LLP

(57) ABSTRACT

Techniques are described herein for performing column functions on virtual columns in database tables. A virtual column is defined by the database to contain results of a defining expression. Statistics are collected and maintained for virtual columns. Indexing is performed on virtual columns. Referential integrity is maintained between two tables using virtual columns as keys. Join predicate push-down operations are also performed using virtual columns.

6 Claims, 2 Drawing Sheets

U.S. PATENT DOCUMENTS

| | | | |
|---|---|---|---|
| 2003/0149702 A1* | 8/2003 | Saffer et al. | 707/102 |
| 2004/0034643 A1* | 2/2004 | Bonner et al. | |
| 2005/0234841 A1 | 10/2005 | Miao et al. | |
| 2005/0240624 A1 | 10/2005 | Ge et al. | |
| 2006/0206507 A1* | 9/2006 | Dahbour | 707/100 |
| 2007/0083483 A1 | 4/2007 | Lawande | |
| 2008/0120321 A1* | 5/2008 | Liu et al. | 707/102 |
| 2008/0120322 A1* | 5/2008 | Liu et al. | 707/102 |
| 2008/0172353 A1* | 7/2008 | Lim et al. | 706/47 |
| 2008/0172360 A1* | 7/2008 | Lim et al. | 707/3 |
| 2009/0018992 A1 | 1/2009 | Zuzarte et al. | |
| 2009/0019077 A1 | 1/2009 | Baby et al. | |

OTHER PUBLICATIONS

U.S. Appl. No. 11/951,933, filed Dec. 6, 2007, Final Office Action mailed Dec. 23, 2010.

Notice of Allowance U.S. Appl. No. 11/951,918, filed Dec. 6, 2007, Correspondence Mailing Date Jul. 21, 2011.

Ian Smith, "Guide to Using SQL: Computed and Automatic Columns", Oracle Rdb Journal — Automatic Columns, Sep. 2008 (originally May 2002), http://www.oracle.com/technetwork/database/rdb/automatic-columns-132042.pdf, 9 pages.

* cited by examiner

VIRTUAL COLUMNS

RELATED APPLICATIONS

The present application is related to U.S. patent application Ser. No. 11/951,918, titled Expression Replacement in Virtual Columns, filed by Subhransu Basu and Harmeek Singh Bedi on Dec. 6, 2007, and U.S. patent application Ser. No. 11/951,933, titled Partitioning in Virtual Columns, filed by Subhransu Basu, Harmeek Singh Bedi, and Ananth Raghavan on Dec. 6, 2007, the entire contents of which are incorporated herein by reference.

FIELD OF THE INVENTION

The present invention relates to database systems, and in particular, to techniques for representing, manipulating, and using columns and expressions in database systems.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
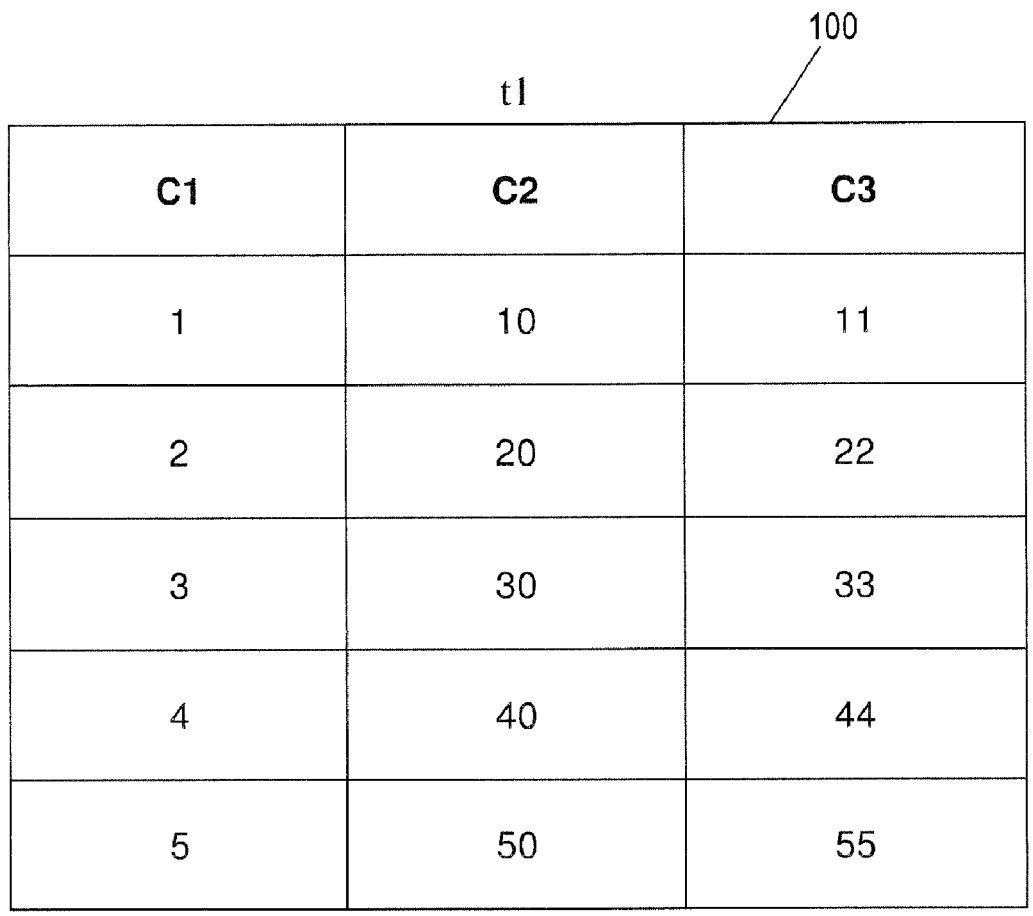
FIG. 1 illustrates an example of a table containing two columns and a virtual column.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Introduction

In a database management system (DBMS), data is stored in one or more data containers, each container contains records, and the data within each record is organized into one or more fields. In relational DBMSs, the data containers are referred to as tables, the records are referred to as rows, and the fields are referred to as columns.

In a relational DBMS, many operations can be performed on columns in tables. For example, statistics can be gathered on columns. Columns can also be indexed. Furthermore, constraints can be defined on columns in different tables for the purpose of maintaining referential integrity between the tables. Columns are also utilized in performing join predicate push-down operations. Finally, tables can be partitioned on columns, enabling optimizations such as partition-pruning and partition-wise joins.

Data in columns is stored as part of a table in databases, consuming permanent storage resources. To circumvent the need to store some data, a user may choose to compute the data only when it is needed for an operation and discard the data once the operation has completed. This computation of data may be specified within an expression in a query language like SQL. Expressions provide a way to compute data on demand without the need for permanent storage. According to an embodiment, expressions are also processed and optimized in the same manner as columns.

Virtual Columns: an Example

According to one technique, virtual columns may be defined within a DBMS to facilitate the processing and manipulation of computed data. A virtual column is a derived, or computed, column, which may or may not be materialized on a disk. In other words, unlike a regular column, which is stored on a disk as part of a table, a virtual column may be stored for only a short period of time in temporary storage such as volatile memory, and may be discarded at the end of an operation. The values contained in a virtual column are derived by computation of an expression or function and are computed on demand. Virtual columns can be used in queries just like any other regular table columns, providing a simple, elegant, and consistent mechanism for accessing expressions in a SQL statement.

A virtual column is illustrated with the following DDL statement.

create table t1 (c1 number, c2 number, c3 as (c1+c2))

When a DBMS receives and processes this statement, it defines and creates a table t1, where columns c1 and c2 contain values of the number data type. Table t1 also includes a virtual column c3. When a DBMS creates a virtual column, such as c3, in response to receiving a DDL statement such as the one above, the DBMS generates metadata defining the virtual column as containing the results of an expression. A defined virtual column need not contain any physical data. Rather, a virtual column logically contains data values which are based on the results of an expression.

Virtual column c3 is derived from the expression "c1+c2", where c1 and c2 are regular columns in table t1. The values in a virtual column conform to the data types in the underlying expression that describes the virtual column. In this case, because c1 and c2 contain values of the number data type, c3 also necessarily contains values of the number data type. Table 100 in FIG. 1 illustrates an example illustrating a table t1 with example values in regular columns c1 and c2 and corresponding computed values in virtual column c3. Table 100 contains five rows. In the first row, for example, column c1 contains the value 1 and column c2 contains the value 10. Therefore, virtual column c3, which contains values that are sums of values in columns c1 and c2, contains the value 11 in the first row. Although virtual column c3 is shown as being in table t1, this is only for the purpose of illustration. Virtual column c3 need not be stored on disk as part of table t1 like regular columns c1 and c2, and often will not be in order to conserve storage resources. When a query statement such as "select c3 of t1" is processed by a DBMS, the values of c3 may be computed dynamically based on values stored in regular columns c1 and c2 at the time of the computation.

Once a virtual column is defined, it may be referenced in SQL queries like a regular column. For example, the following SQL statement uses the virtual column c3 in a select statement.

select * from t1 where c3 > 30

The above statement selects all rows from the table t1 which contain a value greater than 30 in the c3 column. Again, the values in c3 are not stored on disk, but are computed on demand by a DBMS. Therefore, when a DBMS executes the above statement, the sums of the values in regular columns c1 and c2 are calculated and compared to the value 30 in determining which rows in t1 fulfill the query request.

For simplicity, in the examples in this disclosure, virtual column c3 is described by the expression c1+c2. Significantly, a virtual column may also be derived from SQL functions and user-defined functions in addition to expressions.

Collecting Statistics on Virtual Columns

As discussed above, relational DBMSs store data in tables. To retrieve this data, queries are submitted to a database server, which processes the queries and returns the data requested. Users may use a database query language, such as SQL, to specify queries in a variety of ways.

Queries submitted to a database server are evaluated by a query optimizer. When a query optimizer evaluates a query, it generates various "candidate execution plans" and estimates a query execution cost for each execution plan. The candidate execution plan with the lowest estimated query cost is assumed to be the most efficient and is then selected by the query optimizer as the execution plan to be carried out.

Estimating a query cost can be very complex, and a query optimizer may estimate cardinality (the number of rows to scan and process), selectivity (the fraction of rows from a row set filtered by a predicate), and cost in terms of resources such as disk input and output, CPU usage, and memory usage of the various candidate execution plans in the process of determining the most efficient execution plan from several candidate execution plans.

To estimate selectivity, or how many rows from a table will satisfy a predicate, query optimizers utilize statistical data gathered on columns in tables. Predicates in a database query language specify criteria for queries. For example, a query in a candidate execution plan may request all rows from a particular table which satisfy the predicate that the value in a row for a particular column is less than 4.

```
Q1 = SELECT *
     FROM    t1
     WHERE   c1 < 4
```

Thus, the query Q1 requests all rows from table t1 which contain values greater than 4 in column c1. When a query optimizer evaluates a query statement like Q1, it utilizes column statistics to predict the number of rows that will satisfy the predicate in Q1 ("WHERE c1<4") without performing the query itself. For example, column statistics for c1 may be kept in the form of histograms that indicate a distribution of values in c1. Based on this statistical distribution, a query optimizer can quickly estimate how many rows satisfy the predicate "WHERE c1<4" without fetching all the rows in table t1 and examining c1 for every row fetched (a process also known as a "full table scan"). Although table t1 as illustrated in FIG. 1 contains only five rows, tables in typical relational databases may contain a much higher number of rows. Therefore, column statistics are desirable because a query optimizer can utilize these statistics to estimate the selectivity of predicates in different candidate execution plans without scanning a large number of rows.

According to one technique, column statistics are collected and maintained for virtual columns in the same manner that column statistics are currently collected and maintained for regular columns. Collecting and maintaining column statistics for virtual columns allow a query optimizer to efficiently estimate query costs for queries which contain virtual columns. In the following example, virtual column c3, which has been previously defined as "c1+c2", is part of a predicate query Q2. A query optimizer may access column statistics for c3 to evaluate the cost of query Q2.

```
Q2 = SELECT *
     FROM    t1
     WHERE   c3 < 40
```

In contrast, in the following example, the expression "c1+c2" is part of a predicate in query Q3. However, statistics cannot be collected and maintained for the expression, and a query optimizer will not be able to quickly estimate the query cost of query Q3.

```
Q3 = SELECT *
     FROM    t1
     WHERE   (c1 + c2) < 40
```

Thus, although storage resources are conserved in both query Q2 and query Q3 because no column containing the sum of the values in columns c1 and c2 have been saved to disk, the technique of collecting and maintaining statistics for virtual columns allows query Q2 to be efficiently evaluated by a query optimizer.

Therefore, providing statistics support for virtual columns enable query optimizers to estimate the cost of queries containing virtual columns just as efficiently as queries containing regular table columns.

Indexing Virtual Columns

Indexes facilitate faster retrieval of data contained in databases. A database index is conceptually similar to a normal index found at the end of a book, in that both kinds of indexes comprise an ordered list of information accompanied with the location of the information. Values in one or more columns of a table are stored in indexes, which are stored and maintained separately from the table itself. The ordered list of information in an index allows for quick scanning to find a target value or range or values.

According to one technique, indexes are created for virtual columns in the same manner as they are for regular columns. Users may also specifically request that an index be created for particular virtual column(s). Once an index for a virtual column is created, the index is maintained and accessed just like an index for a regular column. The various techniques and schemes currently available for structuring and ordering database indexes based on regular columns, such as bitmaps and filtered indexes, are equally applicable to indexes for virtual columns.

In the example below, an index on virtual column c3 may be consulted to quickly retrieve the results for query Q4.

```
Q4 = SELECT *
     FROM    t1
     WHERE   c3 = 33
```

Although table t1 as illustrated in FIG. 1 contains only five rows and a full-table scan can be quickly performed to retrieve the row containing "30" for c1 and "3" for c2, tables in typical relational databases containing a much higher number of rows. Utilizing indexes is especially desirable in cases where computations of expressions are very costly. The following example illustrates a case where indexing a virtual column can significantly increase the computational efficiency of a query.

```
create table t2 (c4 number, c5 number, c6 as (c4 * c5))
Q5 = SELECT  *
     FROM    t2
     WHERE   c6 > 20
```

Table t2 contains a virtual column c6 which contains values that are the product of values in regular columns c4 and c5. Multiplication is a costly computation. When query Q5 is executed, the values in virtual column c6 are computed and compared to the query predicate "WHERE c6>20". If queries such as Q5, which require access to values in virtual column c6, are common, then the frequent computation of "c4*c5" that is needed to generate and store values for c6 will incur great computational cost. In this case, it is desirable to index the values in virtual column c6 so that queries which require access to values in c6 can directly access the index without the need to recompute, thereby saving a large amount of computational resources. Significantly, an index may be created on virtual column c6 without the need to materialize c6 (i.e., store column c6 on disk as part of table t2).

Referential Integrity for Virtual Columns

Current database systems provide tools for maintaining referential integrity between two or more tables which are logically related. The logical relationships between two tables can be defined by users. For example, Table A contains information about employees and includes a column named "DepartmentNum". Table B contains information about departments and also includes a column named "DepartmentNum". A user may define that the two "DepartmentNum" columns are logically linked so that rows in Table B may only contain values in the "DepartmentNum" column which also exist in the "DepartmentNum" column in Table A. In such a case, the "DepartmentNum" column in Table A is referred to as the "primary key", and the "DepartmentNum" column in Table B is referred to as the "foreign key". Referential integrity is maintained when values in a column declared as the foreign key are limited to values in the column declared as the primary key.

A database system may enforce referential integrity in a variety of ways. One way of enforcing referential integrity requires that when a particular value in the primary key column is removed, corresponding values in foreign key columns are also removed. For example, Table A contains only one row where the value in the DepartmentNum column is 100. The database system then receives a request to remove this row. Table B also contains a row which contains the value 100 in the DepartmentNum column. When the row containing 100 in the DepartmentNum column in Table A is removed, the database automatically removes the row containing 100 in the DepartmentNum column in Table B in order to maintain referential integrity. Another way of enforcing referential integrity is to generate an error message when removing a row from a particular table would break the referential integrity between the particular table and another table. For example, a user may be informed by an error message that he is required to remove rows in tables that depend on a particular table before he can remove a row from the particular table.

According to one technique, virtual columns may be used as primary keys for the purpose of maintaining referential integrity. Significantly, even when a virtual column is used as a primary key, values in the virtual column may be computed from the base columns on which the virtual column depends and need not be stored on disk. In addition, a change to a value in a regular column from which a virtual column derives automatically triggers a re-computation of the virtual column to reflect the most current values in the regular column.

By providing referential integrity for data values contained in virtual columns, users may define and use logical relationships between data computed from expressions without having to manually check that the logical relationships between data remain intact.

Join Predicate Push-Down with Virtual Columns

As discussed above, query optimizers may generate several candidate execution plans in order to determine which execution plan is most efficient for a particular query. One method of generating a candidate execution plan from a query is to transform the original query (also known as a "base query") by rewriting the query into a transformed query which can potentially be executed more efficiently. One way of transforming a query is to use a "join predicate push-down".

In a join predicate pushdown, a join predicate from an outer query that references a column of a view of an outer query is "pushed down" into a view. Join predicate pushdown is illustrated with the following base query QA.

```
QA = SELECT T1.C, T2.x
     FROM T1, T2, (SELECT T4.x, T3.y
         FROM T4, T3
         WHERE T3.p = T4.q and T4.k > 4) V
     WHERE T1.c = T2.d and T1.x = V.x (+) and
         T2.f = V.y(+);
```

Query QA includes view V. V is the alias or label for the subquery expression (SELECT $T4.x$, $T3.y$ FROM T4, T3 WHERE $T3.p=T4.q$ and $T4.k>4$). The subquery expression is referred to herein as a view because it is a subquery expression among an outer query's FROM list items and can be treated, to a degree, like a view or table. Other tables listed in the FROM list are referred to herein as outer tables with respect to the outer query and/or the view. With respect to the view V, Tables T1 and T2 are outer tables, while tables T3 and T4 are not.

Under join predicate pushdown, query QA is transformed to query QA' as follows.

```
QA'= SELECT T1.C, T2.x
     FROM T1, T2, (SELECT T4.x, T3.y
         FROM T4, T3
         WHERE T3.p = T4.q and T4.k > 4 and
             T1.x = T4.x and T2.f = T3.y) V
     WHERE T1.c = T2.d;
```

The join predicate $T1.x=V.x(+)$ of the outer query is pushed down into view V by rewriting the view V to include the join predicate $T1.x=T4.x$. $T4.x$ is the equivalent column of the view V.x. Similarly, the join predicate $T2.f=V.y(+)$ is pushed down into the view. The pushed down join predicates do not specify outer-join notation; the outer-join is internally represented by the table being outer-joined.

A pushed-down predicate opens up new access paths, which are exploited to form candidate execution plans that may more efficiently compute a query. For example, a candidate execution plan may compute the join based on join predicate T2.$d$=T3.$y$ in QA' using an index on either T2.$f$ or T3.$y$ in an index nested-loops join, which is not possible without this transformation.

According to one technique, join predicate pushdown may be performed on queries which contain virtual columns in outer queries. Significantly, this enables expressions to be pushed down into a view.

Hardware Overview

Figure 2:
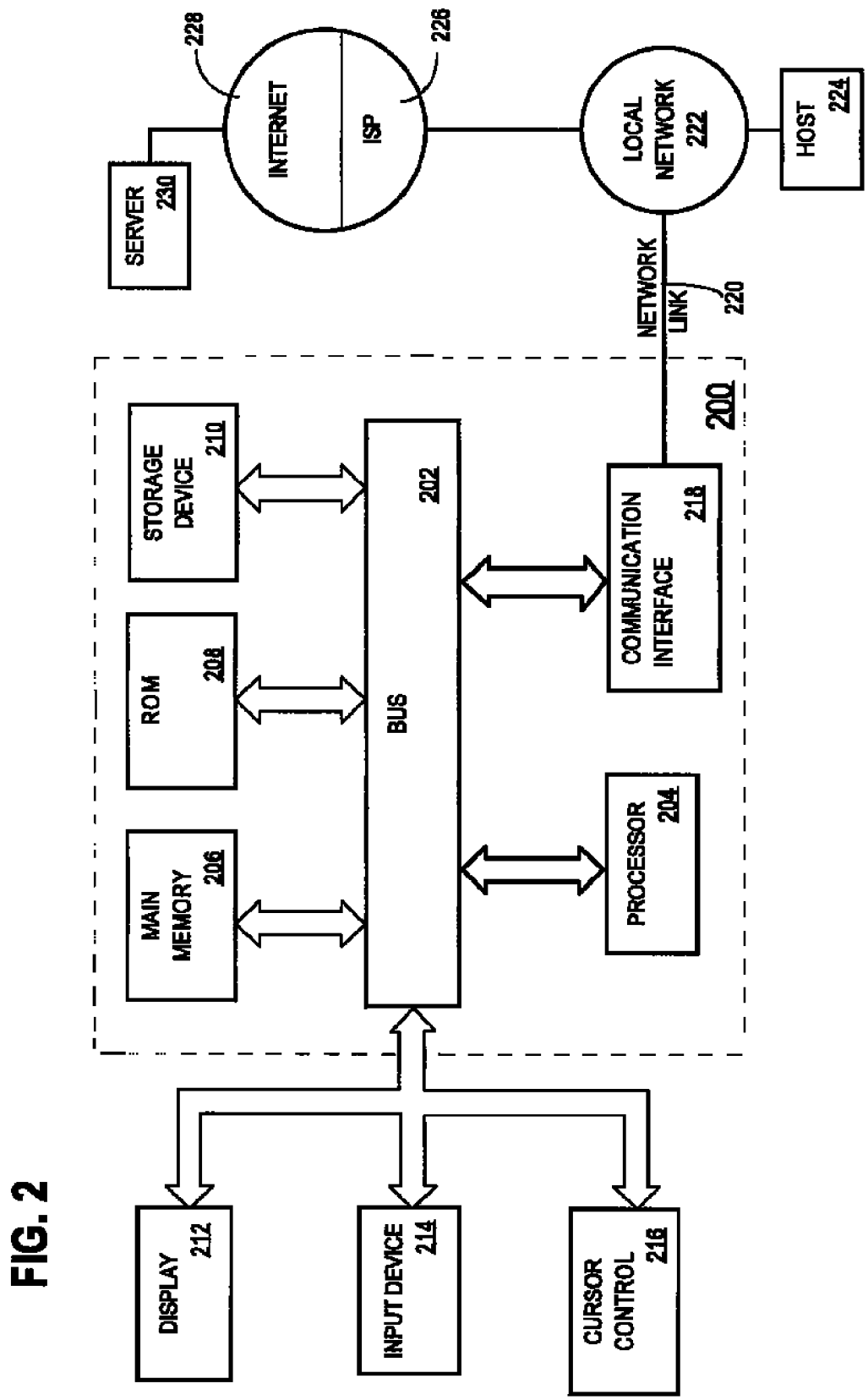
FIG. 2 is a diagram of a computer system that may be used in an implementation of an embodiment of the present invention.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
receiving one or more database commands that request to define a virtual column that contains results of a virtual column expression, said one or more database commands specifying:
a name for said virtual column; and
said virtual column expression;
in response to receiving said one or more database commands, generating database metadata that:
defines said virtual column as a named virtual column having said name; and
defines said virtual column as containing the results of said virtual column expression;
generating statistical data on a distribution of data values contained in said virtual column;
receiving a query that includes at least one predicate, wherein the at least one predicate references said virtual column by said name;
in response to receiving the query:
retrieving, from a statistics database, the statistical data on a distribution of data values contained in said virtual column;
estimating, based on the statistical data, a cost of executing the query; and
computing results for the query, wherein computing results for the query includes computing one or more values for said virtual column according to said virtual column expression; and
wherein the steps are performed by one or more computing devices.

2. The computer-implemented method of claim 1, wherein the step of estimating a cost of executing the query comprises estimating, based on the statistical data, a selectivity of the at least one predicate.

3. A computer-implemented method comprising:
receiving one or more database commands that request to define a virtual column that contains results of a virtual column expression, said one or more database commands specifying: a name for said virtual column;
said virtual column expression; and
that said virtual column is an index key for an index that indexes data values contained in said virtual column;

in response to receiving said one or more database commands, generating database metadata that:
defines said virtual column as a named virtual column having said name;
defines said virtual column as containing the results of said virtual column expression; and
defines said virtual column as said index key for said index;
receiving a query that references said virtual column by name;
retrieving data from said index;
generating results for the query based on said data from said index; and
wherein the steps are performed by one or more computing devices.

4. A non-transitory computer-readable storage medium storing instructions for evaluating queries, the instructions including instructions which, when executed by one or more processors, cause the one or more processors to perform:
receiving one or more database commands that request to define a virtual column that contains results of a virtual column expression, said one or more database commands specifying:
a name for said virtual column; and
said virtual column expression;
in response to receiving said one or more database commands, generating database metadata that:
defines said virtual column as a named virtual column having said name; and
defines said virtual column as containing the results of said virtual column expression;
generating statistical data on a distribution of data values contained in said virtual column;
receiving a query that includes at least one predicate, wherein the at least one predicate references said virtual column by said name;
in response to receiving the query:
retrieving, from a statistics database, the statistical data on a distribution of data values contained in said virtual column;
estimating, based on the statistical data, a cost of executing the query; and
computing results for the query, wherein computing results for the query includes computing one or more values for said virtual column according to said virtual column expression.

5. The non-transitory computer-readable medium of claim 4, wherein estimating a cost of executing the query comprises estimating, based on the statistical data, a selectivity of the at least one predicate.

6. A non-transitory computer-readable storage medium storing instructions for evaluating queries, the instructions including instructions which, when executed by one or more processors, cause the one or more processors to perform:
receiving one or more database commands that request to define a virtual column that contains results of a virtual column expression, said one or more database commands specifying:
a name for said virtual column;
said virtual column expression; and
that said virtual column is an index key for an index that indexes data values contained in said virtual column;
in response to receiving said one or more database commands, generating database metadata that:
defines said virtual column as a named virtual column having said name;

defines said virtual column as containing the results of said virtual column expression; and defines said virtual column as said index key for said index;

receiving a query that references said virtual column by name;

retrieving data from said index;

generating results for the query based on said data from said index.

* * * * *